United States Patent [19]

Okano et al.

[11] Patent Number: 5,389,482
[45] Date of Patent: Feb. 14, 1995

[54] MAGNETIC PARTICLE POWDER INCLUDED IN MAGNETIC TONERS FOR MAGNETIC IMAGE CHARACTER RECOGNITION

[75] Inventors: Yoji Okano; Kazuo Fujioka; Koso Aoki; Hiromitsu Misawa; Eiichi Kurita, all of Hiroshima; Yasuhiko Fujii, Otake, all of Japan

[73] Assignee: Toda Kogyo Corp., Hiroshima, Japan

[21] Appl. No.: 872,399

[22] Filed: Apr. 23, 1992

[51] Int. Cl.$^6$ ............................................. G03G 9/083
[52] U.S. Cl. .................................. 430/106.6; 430/138
[58] Field of Search ...................... 430/106.6, 111, 138; 252/62.59

[56] References Cited

U.S. PATENT DOCUMENTS

| | | | |
|---|---|---|---|
| 3,535,245 | 10/1970 | Linquist et al. | 252/62.58 |
| 4,082,905 | 4/1978 | Stephan et al. | 428/538 |
| 4,517,268 | 5/1985 | Gruber et al. | 430/39 |
| 4,975,214 | 12/1990 | Sakashita et al. | 430/106.6 |
| 5,135,832 | 8/1992 | Sacripante et al. | 430/106.6 |

FOREIGN PATENT DOCUMENTS 77-17074 12/1977 France .
61-1374 7/1985 Japan .

OTHER PUBLICATIONS

European Search Report.

*Primary Examiner*—John Goodrow
*Attorney, Agent, or Firm*—Nixon & Vanderhye

[57] ABSTRACT

A specific magnetic particle powder is described, which is included in magnetic toners used for magnetic image character recognition (MICR). The magnetic particle powder is a magnetite particle and distinguished by the facts that its residual magnetization is of 12 to 20 emu/g, its $Fe^{2+}$ content is of 18.5 to 22.5% by weight, its surface is deposited with Si or Al oxide or mixture thereof and its specific surface area is of 3.5 to 9.5 m$^2$/g. The magnetic particle powder used as one component of the magnetic toner enables the formation of fine accurate images and the exact detection of the image.

6 Claims, 1 Drawing Sheet

MAGNETIC PARTICLE POWDER INCLUDED IN MAGNETIC TONERS FOR MAGNETIC IMAGE CHARACTER RECOGNITION

BACKGROUND OF THE INVENTION

This invention relates to a magnetic particle powder included in magnetic toners used for magnetic image character recognition, which enables the formation of fine accurate images and the exact detection of encoded informations.

Researches on the complexing of different materials to provide a new composite material with high performance or novel functions have actively been pursued. Among them, a composite material comprising a magnetic particle powder and an organic polymer was already employed in magnetic printing materials and electrostatic latent image developers such as magnetic toners and carriers. In recent years, magnetic image character recognition, hereinafter referred to as MICR, is coming to be paid attention attractively, and developments and researches of the magnetic toners which can preferentially be used in MICR are also being carried out intensively. MICR is a technique wherein encoded informations can be read on the surface of a personal check or other document bearing images formed by ordinary characters and images formed and encoded by special numerals or characters to collect and identify such informations. It is particularly widely used for inspecting the personal checks in bank clearing houses. In conventional typography and planography, different inks had to be used for the ordinary character images and for the encoded images. Furthermore, as the ordinary characters and encoded characters could not be printed at the same time, serious problems arose in terms of workability and economic viability. To resolve these problems, a great need had arisen in recent years for magnetic toners that would enable the ordinary character images and the readable encoded images to be formed simultaneoulsy by laser beam printers which are now rapidly coming into wide use.

The magnetic toners used in MICR, as described hereinbefore, must therefore be capable not only of forming ordinary characters in the same way as toners used in the electrostatic image developers, but also of forming special numerals or images encoded by special characters in fine detail. Furthermore, it must also be possible to read the encoded images accurately.

It is particularly important to provide a better reliability when reading the encoded images. This requires a fine image quality with little background and as high an image density as possible. Also, the accurate reading of images requires that signal levels conform as far as possible to nominal signal levels. There was therefore a great need for improvements in the magnetic particle powders having a direct effect on the magnetic toners used to form the images so as to obtain toners with the desired properties.

Conventionally, the magnetic particle powders used in MICR magnetic toners were particulate magnetites such as acicular magnetite or "Mapico Black" supplied by Cities Services Co., as described in U.S. Pat. No. 4,517,268.

As present, there is a great need for new magnetic particle powders for the magnetic toners of MICR, which would enable the formation of fine accurate images and the exact detection of the encoded information. A toner fully satisfying these requirements however had not yet been produced using the conventional magnetic particle powders such as the conventional acicular magnetite or "Mapico Black".

The object addressed by this invention is thus to obtain a magnetic particle powder which is to be included in the magnetic toners used for MICR so as to enable the formation of fine accurate images and the exact detection of the encoded informations.

SUMMARY OF THE INVENTION

The present invention therefore provides a magnetic particle powder included in magnetic toners used for magnetic image character recognitiion, which has a residual magnetization of from 12 to 20 emu/g, contains from 18.5 to 22.5% by weight of $Fe^{2+}$, and is coated with Si oxide, Al oxide or a mixture thereof, wherein these particles have a specific surface area of from 3.5 to 9.5 m$^2$/g.

BRIEF DESCRIPTION OF THE INVENTION

FIG. 1 hereinafter referred to indicates the relation of residual magnetization of the magnetite particles as a final product obtained by the present invention with saturation magnetization of maghemite/hematite composite particles as an intermediate for producing the preceding magnetite particles.

DETAILED DESCRIPTION OF THE INVENTION

Figure 1:
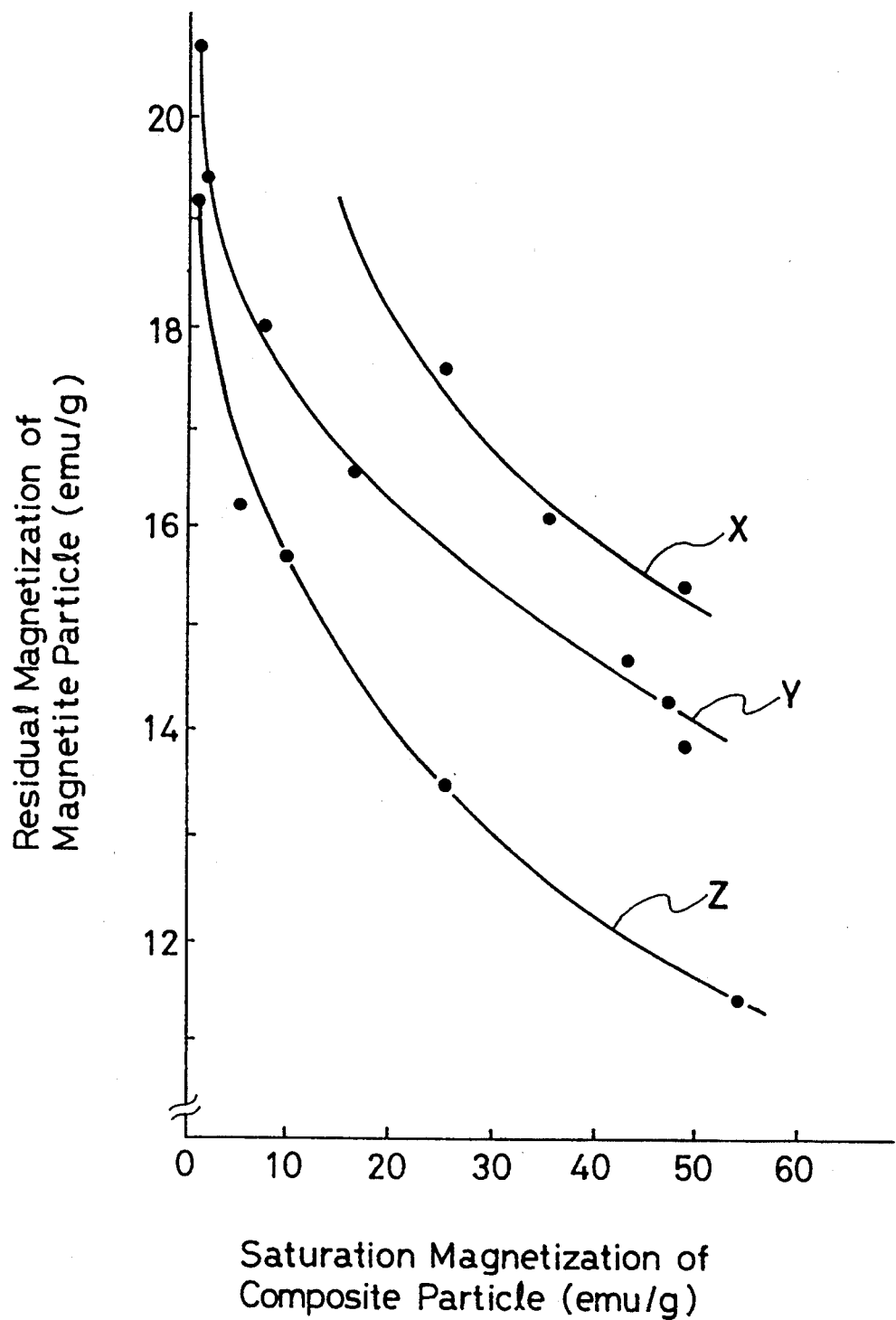

The invention is hereinafter described further in detail with referring to preferred embodiments.

The residual magnetization of the magnetic particle powder according to the invention is from 12 to 20 emu/g. If it is less than 12 emu/g, a suitable output is not obtained when the encoded images are to be read so that the characters cannot be identified. If it is greater than 20 emu/g, the output is above a suitable level so that the characters cannot likewise be identified. In view of the reading reliability, the magnetic particle powder should preferably have a residual magnetization of from 12 to 18.5 emu/g.

The amount of $Fe^{2+}$ in the magnetic particle powder of this invention is from 18.5 to 22.5% by weight. If it is less than 18.5% by weight, the output image has a reddish tinge which is undesirable. To obtain a deep black image of higher density than that given by the conventional magnetic toners, it is sufficient if the upper limit of $Fe^{2+}$ is 22.5% by weight. From the viewpoint of clarity of the image density, the amount of $Fe^{2+}$ should preferably be from 19.5 to 22.5% by weight, or more preferably from 19.5% to 22% by weight.

The magnetic particle powder according to the invention is coated with Si oxide, Al oxide or a mixture thereof. If the particle surface is not coated with these materials, due to poorer dispersibility of the magnetite particles in a vehicle resin, the image density is reduced and the background increases. From the viewpoint of the image density and background, the coating amount is preferably from 0.1 to 2.0% by weight of the magnetite particle in terms of $Al_2O_3$ or $SiO_2$.

The specific surface area of the magnetic particle powder according to the invention is from 3.5 to 9.5 m$^2$/g, preferably, 4.0 to 8.5 m$^2$/g. If it is less than 3.5 m$^2$/g, the dispersibility of the magnetite particles in the vehicle resin decreases and the background increases. If it is greater than 9.5 m$^2$/g, the electrostatic properties of the toner decline and the image density decreases.

The magnetic particle powder according to this invention are magnetite particles in the form of hexahedron, octahedron, polyhedron or sphere.

The magnetic particle powder according to this invention may be prepared by heat oxidation in an oxidizing atmosphere, at 350° C. to 700° C., of magnetite particles synthesized from an aqueous solution containing $Fe^{2+}$ and coated with the Al compound, Si compound or both of these compounds, or alternatively, by preliminary heat oxidation at 200° to 350° C. followed by the heat oxidation at 350° to 700° C. to convert them into maghemite/hematite composite particles coated with the aforesaid oxides, and then by thermal reduction in a reducing atmosphere at 250° to 500° C. of the resultant composite particles.

In the preparation described in the foregoing, the magnetite particles obtained by the wet process are in the form of hexahedron, octahedron, polyhedron or sphere, and have the specific surface area of from 4 to 10 $m^2/g$. In the wet process, an oxidizing gas may be passed at a temperature of from 60° C. to 100° C. into an aqueous solution of Fe-containing precipitate such as $Fe(OH)_2$ or $FeCO_3$, obtained by mixing an aqueous solution of a ferrous salt such as ferrous sulfate with an aqueous solution of alkali such as sodium hydroxide or sodium carbonate, so as to give a black precipitate. Acid radicals are then washed out with water, and the product dried to prevent discoloration. In another method, an aqueous solution containing $Fe^{2+}$ and $Fe^{3+}$ in the ratio 1:2 is prepared using an aqueous solution of ferrous salt such as ferrous sulfate and an aqueous solution of ferric salt such as ferric sulfate, at least one equivalent of an aqueous solution of alkali such as NaOH is added, and the resulting mixture is heated to between 50° and 100° C. to give a black precipitate. Acid radicals are then washed out with water, and the product dried to prevent discoloration.

In the above preparation method, the magnetite particles are coated with an Al compound, Si compound or both of these compounds. The Al compound may include aluminum sulfate, aluminum chloride, aluminum nitrate or sodium aluminate. The Si compound may include water glass, potassium silicate, sodium silicate or collodial silica.

The magnetite particles may be soaked with an aqueous solution of the Al compound, Si compound, or both of Al and Si compounds. Alternatively, the magnetite particles may first be soaked with an aqueous solution of the Al compound, Si compound or both of Al and Si compounds, and an aqueous solution of acid or alkali added to cause deposition of Al oxide hydroxide or hydroxide, or of Si oxide hydroxide or hydroxide, on the surface of the magnetite particles. The latter method is to be preferred.

The heat oxidation temperature in this method is 350° C. to 700° C. If the temperature is less than 350° C., the generation of hematite in the maghemite/hematite composite is insufficient, and only the magnetite particles having a low coercive force and residual magnetization are obtained. If the temperature is higher than 700° C., the magnetite particles having the residual magnetization in the specified range are obtained, but interparticle sintering occurs so that the dispersibility in the vehicle resin is poorer.

In the preparation method described in the foregoing, a heat oxidation at 200° C. to 350° C. may, if necessary, be carried out prior to the heat oxidation at 350° C. to 700° C. In this instance, it is possible to cause the magnetite particles to emit a considerable amount of heat in advance, and therefore it is easy to adjust the temperature when the starting particulate magnetite is converted to the particulate maghemite/hematite composite, to control the amount of hematite in the maghemite/hematite particles, and to control the residual magnetization of the magnetite particles.

If the temperature is less than 200° C., a considerable time is required to initiate the exothermic reaction of the magnetite particles. The sufficient heat may be emitted by the magnetite below 350° C., so there is no advantage in using higher temperatures.

The heat reduction temperature in the present invention is 250° C. to 500° C. If it is less than 250° C., the reduction proceeds too slowly, and a considerable time is required to generate the magnetite particles. If it is higher than 500° C., the reduction proceeds too rapidly causing particle deformations and inter-particle sintering.

The preparation method, by which the amount of hematite in the particulate maghemite/hematite composite may be controlled, makes it possible to obtain the magnetite particles having the residual magnetization corresponding to the amount of hematite, and it is therefore easy to control the residual magnetization of the magnetite particles.

The above relation is represented in FIG. 1, of which data were derived from some experiments among many investigations conducted by the inventors. FIG. 1 shows the relation between the residual magnetization of the magnetite particles finally obtained and the amount of hematite in the maghemite/hematite composite particles. The latter composite particles were produced by the heat oxidation at 400° to 650° C. of three sorts of magnetite particles obtained from the aqueous solution, and the former magnetite particles as a final product were produced by the reduction of the latter composite particles thus obtained. The amount of hematite in the maghemite/hematite composite was expressed using measured values of the saturation magnetization of the composite. The smaller is the saturation magnetization, the greater is the amount of non-magnetic hematite.

In FIG. 1, the lines X to Z correspond to $SiO_2$ containing spherical magnetite particle powder coated with 0.40% by weight of Al oxide as calculated in terms of $Al_2O_3$ (mean average diameter:0.30 µm, $SiO_2$ content:0.23% by weight), octahedral magnetite particle powder coated with 0.25% by weight of Si oxide as calculated in terms of $SiO_2$ (mean average diameter:0.35 µm), and another octahedral magnetite particle powder coated with 0.34% by weight of Al oxide as calculated in terms of $Al_2O_3$ and with 0.54% by weight of Si oxide as calculated in terms of $SiO_2$ (mean average diamete:0.28 µm), respectively.

The magnetite particles thus produced in accordance with the invention is used to manufacture a magnetic toner by including them into the latter. If the toner thus obtained is used to form images, the images are finely accurate and can be read accurately. The magnetite particles of the invention can threfore be advantageously used as the magnetic particle powder for the magnetic toners used in MICR. As shown by comparative examples hereinafter described, if the magnetite particles have the residual magnetization outside the specified range, contain an amount of $Fe^{2+}$ outside the specified range, have the specific surface area outside the specified range, are not coated with Si oxide, Al oxide or a mixture thereof, or contain Si oxide, Al oxide or a mixture thereof only in the interior of the particles but not on the surface of each particle, a magnetic toner having the desired properties cannot be obtained. The inventors therefore consider that the advantages of the magnetic toner according to this invention are due to the facts that the residual magnetization, amount of $Fe^{2+}$ and specific surface area are controlled to lie within the specific ranges, and that the particle surface is coated with Si oxide, Al oxide or a mixture thereof.

EXAMPLES

This invention will now be illustrated in further detail with reference to specific preparation examples and comparative examples, which are by no means limitative to the claimed invention hereinafter defined.

The shapes of the particles obtained in the experiments conducted during the investigation of the invention, as mentioned in the foregoing, and in the following preparation examples and comparative examples were observed by an electron microscope.

The magnetic properties of the particle powder were measured by means of "Vibration Sample Magnetometer VSM-3S-15" manufactured by Toei Kogyo K.K. in Japan under the condition of applying an external magnetic field up to 10 KOe.

Image quality was evaluated in relative terms by measuring the image density and the degree of background using a Macbeth Reflection Densimeter, and the reliability of reading the image was evaluated in relative terms by comparing the relative signal levels as described in JIS X9002. The relative signal level was found by comparing the signal level of an image measured by an MICR Test Reader and the nominal signal level for the same image, and was expressed as a proportion and percentage. The closer the signal level is to the nominal signal level, i.e., the closer the percentage is to 100%, the higher is the reliability of reading. Formation of Magnetite Particles from Aqueous Solution:

Table 1 shows the properties of magnetite particle powders A to F produced by the wet process involving an oxidation reaction using an aqueous solution which contains $Fe^{2+}$.

tate of the magnetite particles having an $SiO_2$ film deposited on their surfaces. The suspension containing this black precipitate was filtered, washed and dried.

Fluorescent X-ray spectroscopy showed that the amount of $SiO_2$ on the surface of the black particles obtained was 0.25 percent by weight as calculated in terms of $SiO_2$.

One kg of these magnetite particles coated with $SiO_2$ was introduced into a 3 l retort having one open end. Air was passed through at a rate of 5 l/min while rotating the retort, and at the same time the particles were heated at 300° C. for 60 min, and were then heat oxidized at 390° C. for 90 min to obtain a powder of a maghemite/hematite composite.

A part of the above maghemite/hematite composite particle powder was taken out and subjected to a measurement of saturation magnetization, which was found to be 63.2 emu/g.

Thereafter, the atmosphere in the retort was replaced by $N_2$, and the flow gas was changed to 2 l of $H_2$ gas/min while the contents of the retort were heat reduced at 340° C. for 150 min to obtain a magnetite particle powder.

Electron microscope observation showed that the particles of this resultant magnetite particle powder had the same shape as those of the starting magnetite particle and that they were distinctly separate from one another. The powder had a residual magnetisation $\sigma_r$ of 13.5 emu/g, and contained 21.2 percent by weight of $Fe^{2+}$. Its BET specific surface area was 4.1 m²/g.

Preparation Example 2

Sodium hydroxide was added to a suspension obtained by mixing 1 kg of magnetite particle powder C with 10 l of water to adjust the pH to 9. 17.2 g of #3 water glass (supplied by Tokuyama Soda, co., Ltd., containing 29 percent by weight of Si as calculated in terms of $SiO_2$), corresponding to 0.5 percent by weight of $SiO_2$ with respect to the starting magnetite powder, and 10.0 g of aluminum sulfate (supplied by Yoneyama Yakuhin Kogyo K.K., containing 30 percent by weight of Al as calculated in terms of $Al_2O_3$), corresponding to 0.3 percent by weight of $Al_2O_3$ with respect to the

TABLE 1

| | Type of Magnetite Particle | | | | |
|---|---|---|---|---|---|
| No. | Shape | Average Diameter (μm) | Specific Surface area (m²/g) | Content of Fe2+ (wt %) | Residual Magnetization (emu/g) | Content of $SiO_2$ (wt %) |
| A | Particulate | 0.31 | 3.5 | 18.2 | 8.5 | — |
| B | Particulate | 0.28 | 5.6 | 18.0 | 9.8 | — |
| C | Particulate | 0.22 | 7.3 | 17.9 | 10.4 | — |
| D | Particulate | 0.22 | 7.3 | 18.3 | 10.5 | 0.24 |
| E | Particulate | 0.15 | 8.9 | 15.1 | 13.2 | 0.05 |

HEAT TREATMENT OF MAGNETITE PARTICLES FORMED IN THE FOREGOING

Preparation Example 1

Sodium hydroxide was added to a suspension obtained by mixing 1 kg of magnetite perticle powder A with 10 l of water to adjust the pH to 11, 17.2 g of #3 water glass (supplied by Tokuyama Soda, Co., Ltd., containing 29 percent by weight of Si as calcutated in terms of $SiO_2$), corresponding to 0.5 percent by weight as calculated in terms of $SiO_2$ with respect to the starting magnetite particles, was then added thereto followed by stirring the mixture and sulfuric acid was added to adjust the pH to 9. This gave a black precipistarting magnetite powder, were then added thereto and stirred, and sulfuric acid was then added thereto to adjust the pH to 7. This resulted in a black precipitate of the magnetite particles having aluminum hydroxide and $SiO_2$ deposited on their surfaces. The suspension containing this black precipitate was filtered, washed and dried.

Fluorescent X-ray spectroscopy showed that the amounts of Si and Al on the surface of the black particles obtained were respectively 0.50 percent by weight as $SiO_2$ and 0.20 percent by weight as $Al_2O_3$. One kg of these magnetite particles coated with $SiO_2$ and $Al_2O_3$ was introduced into a 3 l retort having one open end.

Air was passed through every minute at a rate of 5 l/min while rotating the retort, and at the same time the particles were heated at 300° C. for 60 min and then heat oxidized at 530° C. for 90 min to obtain a powder of maghemite/hematite composite.

A part of the above maghemite/hematite composite powder was taken out and subjected to a measurement of saturation magnetization, which was found to be 21.5 emu/g.

Thereafter, the atmosphere in the retort was replaced by $N_2$, and then the flow gas was changed to $H_2$ at a rate of 5 l/min while the contents of the retort were heat reduced at 310° C. for 220 min to obtain a magnetite particle powder.

Electron microscope observation showed that the particles of this resultant magnetite powder had an average diameter of 0.27 μm, the same shape as those of the starting magnetite particle, and they were distinctly separate from one another. The powder had a residual magnetisation $\sigma_r$ of 14.5 emu/g and contained 19.8 percent by weight of $Fe^{2+}$. Its BET specific surface area was 8.4 m²/g.

Preparation Example 3

One kg of the magnetite particle powder C coated with Al oxide and Si oxide, which were produced in the same manner as described in Preparation Example 2, was introduced into a 3 l retort having one open end. Air was passed through every minute at a rate of 5 l/min while rotating the retort, and at the same time the particles were heated at 300° C. for 60 min and then heat oxidized at 560° C. for 90 min to obtain a powder of a maghemite/hematite composite.

A part of the above maghemite/hematite composite powder was taken out and subjected to a measurement of saturation magnetization, which was found to be 10.8 emu/g.

Thereafter, the atmosphere in the retort was replaced by $N_2$, and then the flow gas was changed to $H_2$ at a rate of 5 l/min, while the contents of the retort were heat reduced at 320° C. for 190 min to obtain a magnetite particle powder.

Electron microscope observation showed that the particles of this resultant magnetite powder had an average diameter of 0.28 μm, the same shape as those of the starting magnetite particle, and they were distinctly separate from one another. The powder had a residual magnetisation $\sigma_r$ of 16.3 emu/g and contained 20.7 percent by weight of $Fe^{2+}$. Its BET specific surface area was 8.1 m²/g.

Preparation Examples 4-5 and Comparative Examples 1-2

Magnetite particle powders were obtained in the same manner as in Preparation Example 1, excepting that the type of starting magnetite powder, type and amount of coating material, heat oxidation temperature, oxidation time, reducing temperature and reducing time were varied in producing the magnetite particles. Table 2 shows the main producing conditions and properties of the products obtained.

TABLE 2

| Preparation Examples and Comparative Examples | Starting Particle | Coating Operation Coating Material | Amount (wt %) | Preparation of Paticulate Maghemite/Hematite Composite | | | |
|---|---|---|---|---|---|---|---|
| | | | | Pre-heating | | Heat Oxidation | |
| | | | | Oxidation Temperature (°C.) | Time (min) | Oxidation Temperature (°C.) | Time (min) |
| Preparation Ex. 1 | A | #3 Water Glass | 0.5 | 300 | 60 | 390 | 90 |
| Preparation Ex. 2 | C | #3 Water Glass | 0.5 | | | | |
| | | Aluminum Sulfate | 0.3 | 300 | 60 | 530 | 90 |
| Preparation Ex. 3 | C | #3 Water Glass | 0.5 | | | | |
| | | Aluminum Sulfate | 0.3 | 300 | 60 | 560 | 90 |
| Preparation Ex. 4 | B | #3 Water Glass | 0.5 | | | | |
| | | Aluminum Sulfate | 0.5 | 290 | 60 | 520 | 90 |
| Preparation Ex. 5 | B | #3 Water Glass | 0.5 | | | | |
| | | Aluninum Sulfate | 0.5 | 290 | 60 | 570 | 90 |
| Comparative Ex. 1 | D | — | — | 300 | 60 | 570 | 90 |
| Comparative Ex. 2 | B | #3 Water Glass | 0.5 | | | | |
| | | Aluminum Sulfate | 0.3 | 290 | 60 | 600 | 90 |

| Preparation Examples and Comparative Examples | Particulate Maghemite/Hematite Composite Saturation Magnetization (emu/g) | Preparation of Paticulate Magnetite powder | | Paticulate Magnetite powder | | | | |
|---|---|---|---|---|---|---|---|---|
| | | Reduction Temp. (°C.) | Reduction Time (min) | Average Diameter (μm) | Specific Surface Area (m²/g) | Content of $Fe^{2+}$ (wt %) | Residual Mangetization (emu/g) | Coated Amount of Si or Al Oxide (wt %) |
| Preparation Ex. 1 | 63.2 | 340 | 150 | 0.39 | 4.1 | 21.2 | 13.5 | 0.25 |
| Preparation Ex. 2 | 21.5 | 310 | 220 | 0.27 | 8.4 | 19.8 | 24.5 | 0.50 0.20 |
| Preparation Ex. 3 | 10.8 | 320 | 190 | 0.28 | 8.1 | 20.7 | 16.3 | 0.50 0.20 |
| Preparation Ex. 4 | 6.5 | 360 | 150 | 0.34 | 6.4 | 22.1 | 18.0 | 0.51 0.34 |
| Pxeparation Ex. 5 | 2.2 | 340 | 140 | 0.36 | 6.1 | 22.2 | 19.7 | 0.51 0.34 |
| Comparative Ex. 1 | 10.2 | 340 | 150 | 0.31 | 7.5 | 21.8 | 15.5 | — |
| Comparative Ex. 2 | 1.7 | 320 | 180 | 0.36 | 6.0 | 20.4 | 20.5 | 0.51 0.19 |

MANUFACTURE OF MAGNETIC TONER

Example 6

70 parts by weight of the magnetite particle powder obtained in Preparation Example 4, 100 parts by weight of styrene acrylic resin, 0.5 parts by weight of a negative charge control agent and 3 parts by weight of low molecular weight polypropylene were mixed together in a mixer at 140° C. for 15 minutes, cooled, coarsely crushed and then finely ground. This finely ground substance was then classified pneumatically to give a magnetic toner, to which colloidal silica was added so as to obtain a negative chargeable magnetic developer.

This developer was introduced into a Hewlett Packard Laser Jet Printer III, and used to form an image. The image was black with high density and very low background, and the fixedness was excellent. MICR output was also satisfactory, and reliability of reading images was adequate.

31.4 emu/g, amount of Si on the surface: 0.33 percent by weight as $SiO_2$).

TABLE 3

| | Magnetite Particle | | Image quality | | | | MICR Caractaristics | |
|---|---|---|---|---|---|---|---|---|
| Example | Type | Content of Magnetite (party by weight) | Fixed-ness | Color | Image density | Back-ground | Output | Reli-ability |
| Ex. 1 | Preparation Example 4 | 70 | 5 | Black | 5 | 5 | 3 | 3 |
| Ex. 2 | Preparation Example 5 | 70 | 5 | Black | 5 | 5 | 5 | 5 |
| Ex. 3 | Preparation Example 3 | 85 | 5 | Black | 5 | 5 | 5 | 5 |
| Ex. 4 | Preparation Example 4 | 105 | 4 | Black | 4 | 5 | 5 | 5 |
| Ex. 5 | Preparation Example 1 | 125 | 4 | Black | 3 | 4 | 4 | 4 |
| Ex. 6 | Comparative Example 1 | 105 | 4 | Black | 4 | 2 | 4 | 2 |
| Ex. 7 | Comparative Example 2 | 70 | 5 | Black | 5 | 5 | 2 (Excessive) | 2 |
| Ex. 8 | Particulate Magnetite E | 125 | 3 | Reddish black | 3 | 5 | 2 (Insufficient) | 2 |
| Ex. 9 | Particulate Magnetite B | 155 | 3 | Slightly Reddish black | 3 | 5 | 2 (Insufficient) | 2 |
| Ex. 10 | Acicular Magnetite F | 45 | 3 | Reddish Black | 2 | 2 | 1 (Insufficient) | 1 |

Evaluation: Each number is scored in line with the following criteria:
1. Fairly bad
2. Bad
3. Acceptable
4. Good
5. Fairly good

Examples 7-15

Negatively changeable magnetic developers were prepared in the same manner as in Example 6 excepting that the type of magnetic powder was varied. Images were formed using these negatively changeable magnetic developer in the same way as in Example 6. Table 3 shows the image properties and MICR characteristics.

The magnetite particle powder used in Example 13 was Mapico Black supplied by Cities Services, Co., and the acicular magnetite particle powder F used in Example 15 was a product of MTA-740 supplied by Toda Corp. (long axis:0.4 μm, aspect ratio (long axis:short axis)=6.7, specific surface area: 19.9 m²/g, amount of $Fe^{2+}$: 14.0 percent by weight, residual magnetization:

What is claimed is:

1. A magnetic toner used for magnetic image character recognition, said toner containing a magnetic particle powder comprising magnetite particles having a residual magnetization of from 12 to 20 emu/g, containing from 18.5 to 22.5% by weight of $Fe^{2+}$, coated with silicon oxide, aluminum oxide or a mixture thereof, and having a specific surface area of from 3.5 to 9.5 m²/g.

2. The magnetic toner of claim 1, wherein the residual magnetization of the magnetite particles is from 12 to 18.5 emu/g.

3. The magnetic toner of claim 1, wherein the magnetite particles contain 19.5 to 22.5% of $Fe^{2+}$ by weight.

4. The magnetic toner of claim 1, wherein the amount of Si and/or Al oxide coated on the magnetite particles is 0.1 to 2.0% by weight as calculated in terms of $Al_2O_3$ or $SiO_2$.

5. The magnetic toner of claim 1, wherein the specific surface area of the magnetite particles is 4.0 to 8.5 m²/g.

6. The magnetic toner of claim 1, wherein the magnetite particles are in the form of a hexahedron, octahedron, polyhedron or sphere.

* * * * *